June 22, 1965  B. W. ÖLANDER ETAL  3,190,673
PUSH CART FOR SELF-SERVING STORES
Filed Nov. 7, 1962
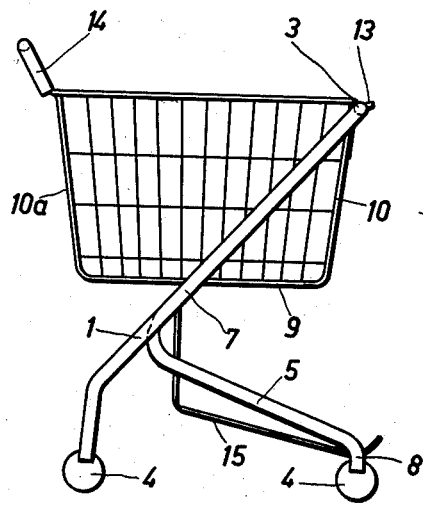
Fig.1
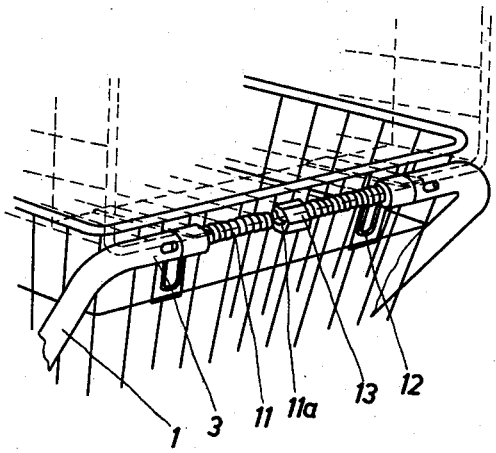
Fig.4
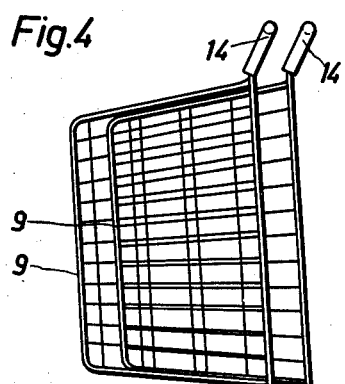
Fig.3
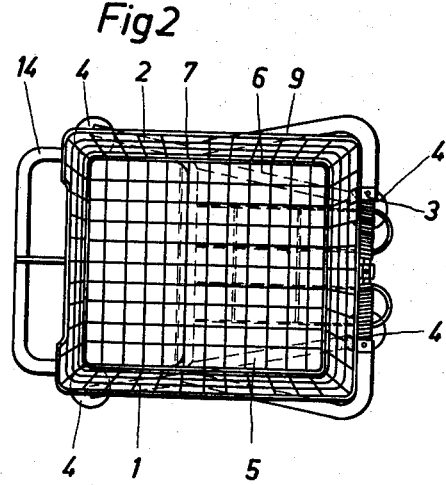
Fig.2
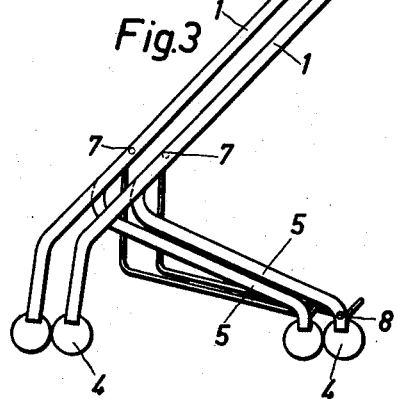
Inventors:
Bertil Wilhelm Ölander
Sven Gustav Jonsson
by

United States Patent Office 3,190,673
Patented June 22, 1965

3,190,673
PUSH CART FOR SELF-SERVING STORES
Bertil Wilhelm Ölander, Hagersten, and Sven Gustav Jonsson, Stockholm, Sweden, assignors to Heinrich Fischer KG, Winterlingen, Wurttemberg, Germany
Filed Nov. 7, 1962, Ser. No. 235,975
3 Claims. (Cl. 280—33.99)

The present invention relates to a push cart for self-serving stores which comprises a basket and a wheel or the like supported frame carrying the basket. Push carts of this general type are well known.

The heretofore known push carts of the above mentioned general type have the drawback that in order to be able to nest the same for storage purposes the rear end wall of the basket, i.e. the end wall adjacent the push handle must be tiltable inwardly.

It is an object of this invention to provide a push cart for self-serving stores, in which baskets may be employed which do not have a tiltable rear end wall.

It is another object of this invention to provide a push cart as set forth in the preceding paragraph, which can be nested in such a way as to occupy a minimum of space.

These and other objects and advantages of the invention will appear more clearly from the following specification in connection with the accompanying drawing, in which:

FIG. 1 illustrates a push cart according to the present invention in its operative condition.

FIG. 2 is a top view of FIG. 1.

FIG. 3 shows two push carts of the type shown in FIG. 1 in storage position.

FIG. 4 shows means for facilitating the movement of the basket from operative position to storage position.

The push cart according to the present invention is characterized primarily by a supporting frame having its upper end tiltably supporting the basket in such a way that the basket may selectively be moved out of a substantially horizontal or operative position into a substantially vertical or storage position. The supporting frame carries a support for the basket in its operative position while said support is so arranged that it will not interfere with the nesting of the push carts in storage position.

Referring now to the drawing in detail, it will be seen from the drawing that the push cart consists primarily of a frame comprising a substantially U-shaped member with legs 1 and 2 and a connecting portion 3 at the upper end of said legs. As will also be seen from the drawing, the legs 1 and 2 are inclined to the connecting horizontal portion 3. The free lower ends of legs 1 and 2 carry rollers or wheels 4 or the like in a manner known per se. Connected to each of the legs 1 and 2 in any convenient manner, for instance by screws, are additional legs 5 and 6 the lower ends of which are likewise provided with wheels or rollers 4 or the like. Between the two legs 1 and 2 there is provided a transverse rod or bar 7 which is preferably arranged at such a level that when the basket is in its operative position, its bottom is located in a substantially horizontal or slightly inclined plane. Also the legs 5 and 6 are preferably interconnected by a transverse bar 8.

The thus designed frame carries a basket 9 which may be a steel wire basket as is customarily used in connection with push carts. The upper front end portion of the basket is pivotally connected to the upper ends of legs 1 and 2 in such a way that the basket can be tilted upwardly from its operative position shown in FIG. 1 into its storage position shown in FIG. 3. The pivotal connection of the basket with the legs 1 and 2 may be effected in any convenient manner. The operative position of basket 9 may, if desired, be such that the basket will have the tendency automatically to move from its operative position into its storage position. To this end, in conformity with FIG. 4, the horizontal portion 3 of the frame may be surrounded by a helical spring 11 one end 11a of which is connected to said part 3 while the other end 12 rests from below against the front wall 10 of basket 9. This spring aids in tilting the basket upwardly against an abutment 13 on the frame arm 3, when the push cart is to be nested into other push carts.

In its lowermost or operative position the basket 9 rests on the supporting frame midway between the rollers 4 thus ensuring a uniform distribution of the load. As long as the basket is empty, its inherent weight and the location of its center of gravity with regard to the tilting axis is sufficient to overcome the tension of the spring 11 and to maintain the basket in its operative position. In other words, the spring is not strong enough to lift the empty basket out of its operative position. The tilting of the basket upwardly is to be effected by hand, the user's effort being aided by the spring. With the basket being tilted into its uppermost or storage position, the tension of the spring 11 is sufficient to maintain the basket in its uppermost position inasmuch as the effective length of the lever arm of the weight of the basket has become shorter due to the tilting movement of the basket. In other words, the tension of the spring 11 is so selected that it is sufficient to overcome the momentum (weight $x$ spacing of the center of gravity of the basket from the tilting axis) of the empty basket in its uppermost position, but insufficient to overcome the same in the operative position of the basket.

The push cart is in customary manner provided with a handle 14 arranged adjacent the rear end wall 10a of the basket. Below the basket and connected to the frame is a compartment 15 which may be formed by an approximately rectangular-shaped sheet metal plate or wire netting for receiving larger parcels and the like.

Those frame portions which extend in the normal travelling direction of the push cart and are to be nested in each other, i.e. in particular the legs 5 and 6, are so designed that they converge in said travelling direction as is clearly shown in FIG. 2. The basket is so designed that all walls thereof taper in the direction toward the bottom so that an easy nesting of the baskets in each other can be effected when the baskets have been folded up into storage position. It will be appreciated that since the open end of one basket in this way is wider than the bottom portion of the next following basket to be nested, it will be evident that the nesting can be effected in a simple and easy manner. This is clearly shown in FIG. 3.

It is, of course, to be understood that the present invention is, by no means, limited to the particular construction shown in the drawing but also comprises any modifications within the scope of the appended claims.

What we claim is:

1. A push cart for self-serving stores, which includes: a U-shaped frame comprising two spaced legs extending at an acute angle with regard to a horizontal plane and also comprising a transverse arm interconnecting the upper ends of said legs, first wheel means respectively arranged at the lower ends of said legs for supporting the same, a transverse supporting member interconnecting said legs at points between said transverse arm and said first wheel means, auxiliary legs having one end thereof respectively connected to said first mentioned legs at points between said first wheel means and said transverse supporting member, second wheel means connected to the other ends of said auxiliary legs for supporting same, said auxiliary legs extending from their points of connection with said first mentioned legs downwardly at an acute angle with regard to a horizontal plane through said first and second wheel means in a direction toward the projection of said transverse arm upon said last mentioned horizontal plane, and basket means having one end thereof tiltably connected to said transverse arm for tilting movement about the axis thereof and having its opposite end provided with handle means, said basket means being tiltable selectively from a storage position in which the longitudinal extension of said basket means is approximately in vertical direction to a use position in which the longitudinal extension of said basket means is substantially in horizontal direction, said transverse supporting member being spaced from said transverse arm by such a distance that in said use position said basket means is supported at the bottom thereof by said transverse supporting member.

2. A push cart according to claim 1, which includes spring means operatively connecting said basket means to said frame and operable to hold said basket means in its storage position when said basket means is empty.

3. A push cart according to claim 1, in which said transverse supporting member engages the central bottom portion of said basket means when the latter is in its use position.

References Cited by the Examiner
UNITED STATES PATENTS

| | | | |
|---|---|---|---|
| 2,590,048 | 3/52 | Sides | 280—33.99 |
| 2,689,132 | 9/54 | Kahn | 280—33.99 |
| 2,738,201 | 3/56 | Spears | 280—33.99 |
| 2,776,843 | 1/57 | Just et al. | 280—33.99 |

A. HARRY LEVY, *Primary Examiner.*

PHILIP ARNOLD, *Examiner.*